United States Patent Office 2,919,624
Patented Jan. 5, 1960

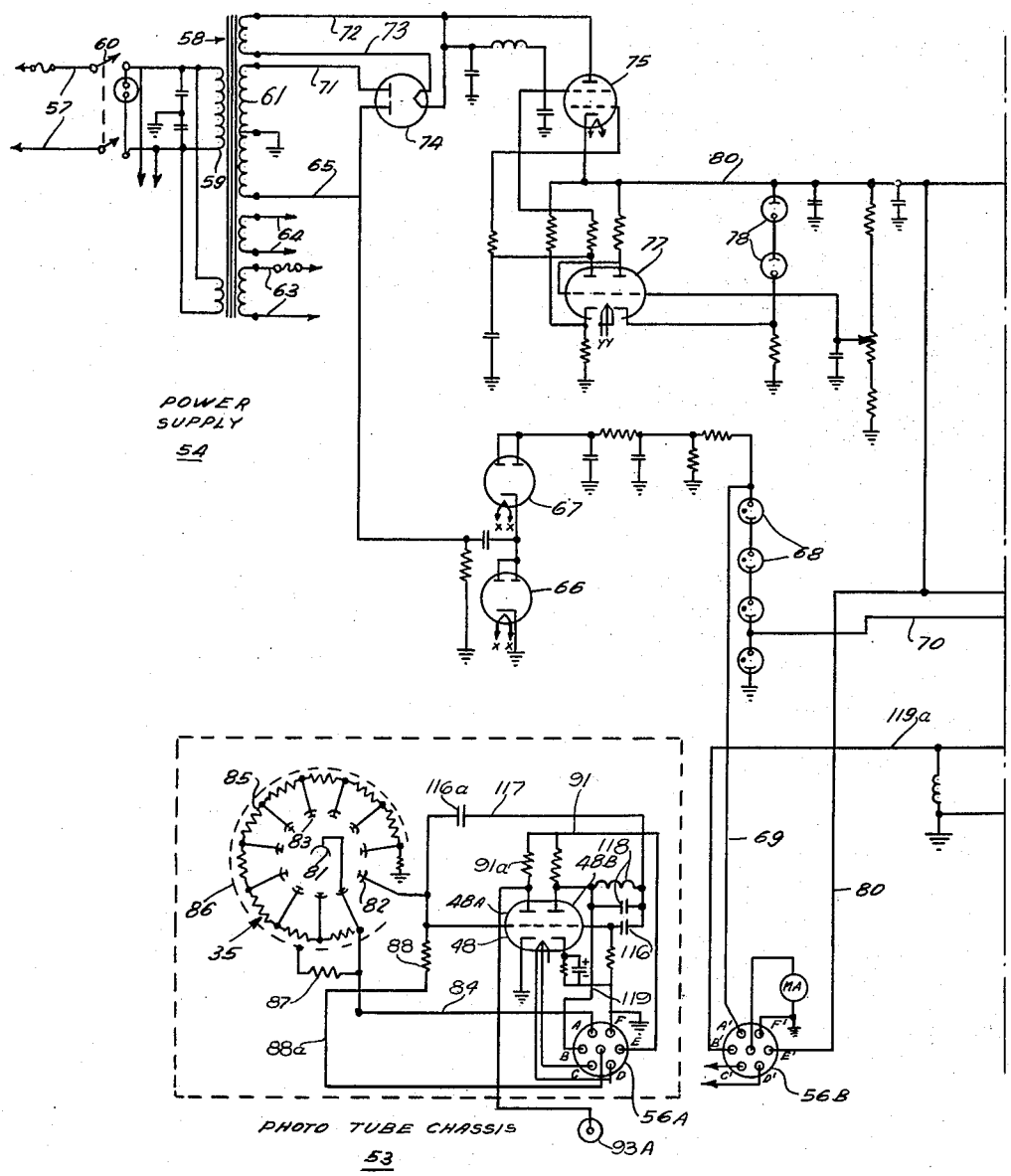

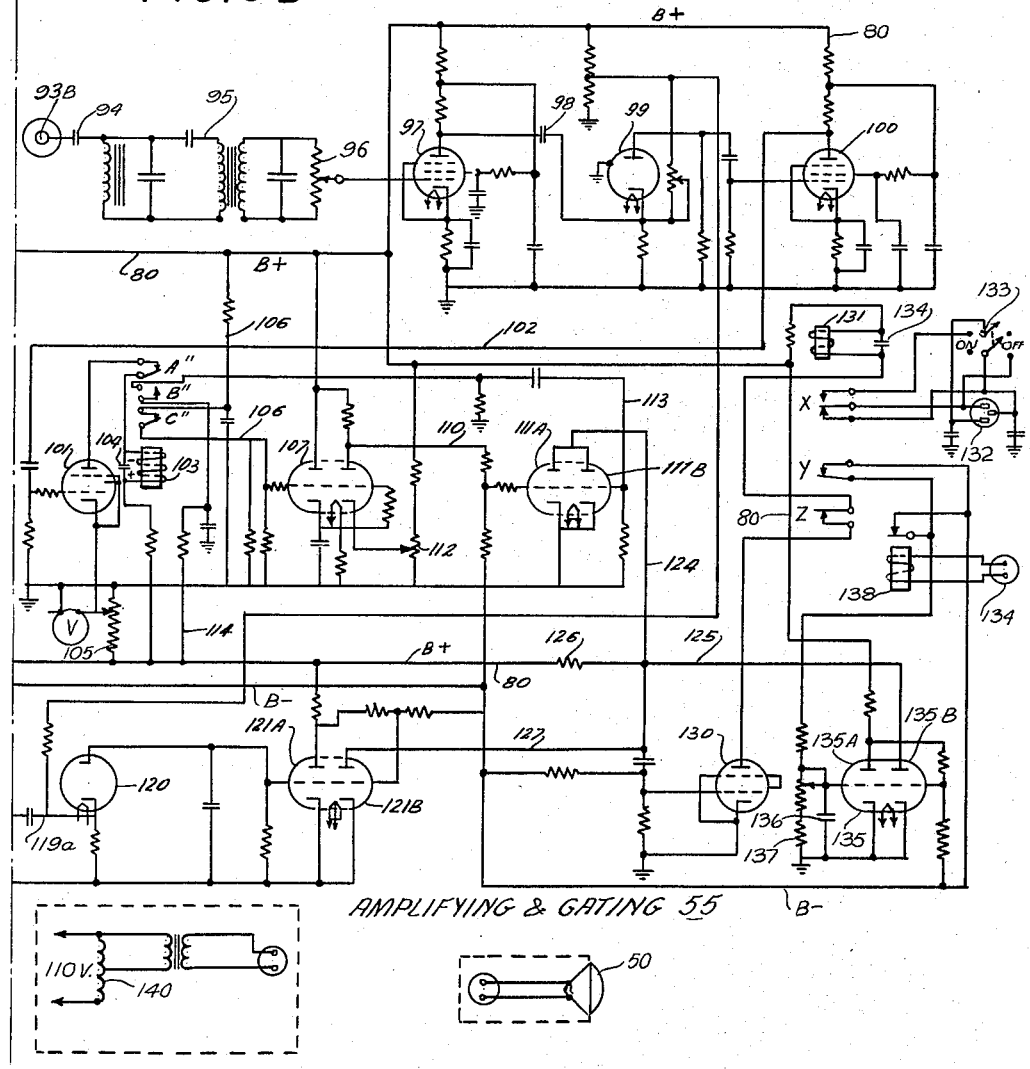

2,919,624

APPARATUS FOR INSPECTING MATERIAL

Howard C. Lindemann, Westbury, and Daniel J. Mindheim, Glen Cove, N.Y., assignors to Lindly & Company, Inc., Nassau County, N.Y., a corporation of New York Application June 4, 1957, Serial No. 663,518

8 Claims. (Cl. 88—14)

The present invention relates to apparatus for inspecting material to detect defects, the term "defect" being herein used to denote any deviation from a normal pattern. The invention relates particularly to apparatus using light as a medium for inspecting material and detecting defects by variation in light transmitted by or reflected from the material and received by a sensing unit. Apparatus in accordance with the invention is particularly applicable to inspecting material having a substantial width, the term "width" being used to denote lateral or circumferential extent. Material to be inspected may have a flat or curved surface. Apparatus in accordance with the invention is especially useful in inspecting woven or knitted cloth which may come off the machine in the form of a flat sheet or, in the case of circular looms or circular knitting machines, in the form of a circular tube or cylinder. By way of example, the invention is herein described as supplied to inspecting knitted fabric produced by a tricot warp knitting machine.

Present knitting machines are capable of producing fabric that is quite wide, for example 168 inches. The number of needles in such machines varies with the width of the needle bed and the gauge of the machine but in any event is quite large. A defect on a single needle, for example, a broken or defective yarn, a broken needle or a bent, broken or stuck latch, produces a corresponding defect in the knitted fabric which may appear as a drop stitch or run. Unless such defect is detected quickly, the machine will continue to produce defective fabric with resulting waste of both material and time.

Apparatus heretofore available for optically detecting defects in cloth has been subject to limitations and has not been entirely satisfactory. Existing detectors are too slow for modern high speed knitting machines. Moreover, they have customarily required a carriage movable back and forth on a track extending transversely of the material and carrying a detecting device. In order for the apparatus to detect defects as quickly as possible after they occur, the track needs to be close to the loom or knitting machine. However, if the track is close to the machine, it interferes with operation and servicing of the machine. Moreover, the continual travel of the carriage back and forth along the track and particularly the sudden reversals of movement at the ends of the travel result in jarring the delicate detecting elements of the equipment.

It is an object of the present invention to overcome the defects of prior equipment and to provide improved apparatus for inspecting material. In accordance with the invention, the inspecting equipment is mounted at a distance from the material to be inspected and is stationary except for rotational movement about its axis. For example, in an installation for inspecting cloth as it comes from a loom or knitting machine, the apparatus is mounted near the ceiling or in other convenient location and is oscillatable about its axis to scan the fabric as it comes from the machine in much the same manner that a spectator at a tennis match "scans" the court by turning his head back and forth. Although the apparatus is mounted at a distance from the machine and is hence out of the way, it can be directed on the fabric close to the needle bar so that defects are detected quickly and wasted fabric is kept at a minimum. The oscillating unit preferably also includes a lamp for projecting a beam of light onto the material as it is scanned.

It is a further object of the invention to provide scanning apparatus which is so sensitive as to detect even small defects and yet effectively avoids false signals. When a knitting machine is stopped, a line known as a "stop mark" is produced in the fabric and this in itself is a defect. Hence, if a stop-motion mechanism produces false stops, it actually causes defects. A feature of the present invention is to avoid spurious responses.

A problem that arises by reason of the scanning unit being located at a distance from the fabric is that other objects, for example a crane or a workman's hand, may come between the scanning unit and the material and thereby actuate the scanner. A feature of the invention is that the apparatus, while very sensitive, is not actuated by extraneous objects coming between the scanner and the material.

Other objects, advantages and characteristics of the invention will appear from the following description and claims in conjunction with the accompanying drawings in which there is shown by way of example an embodiment of the invention particularly applicable to inspecting knitted fabric. In the drawings:

Figs. 9A and 9B are together a circuit diagram of the electrical circuitry of the apparatus.

Figure 1:
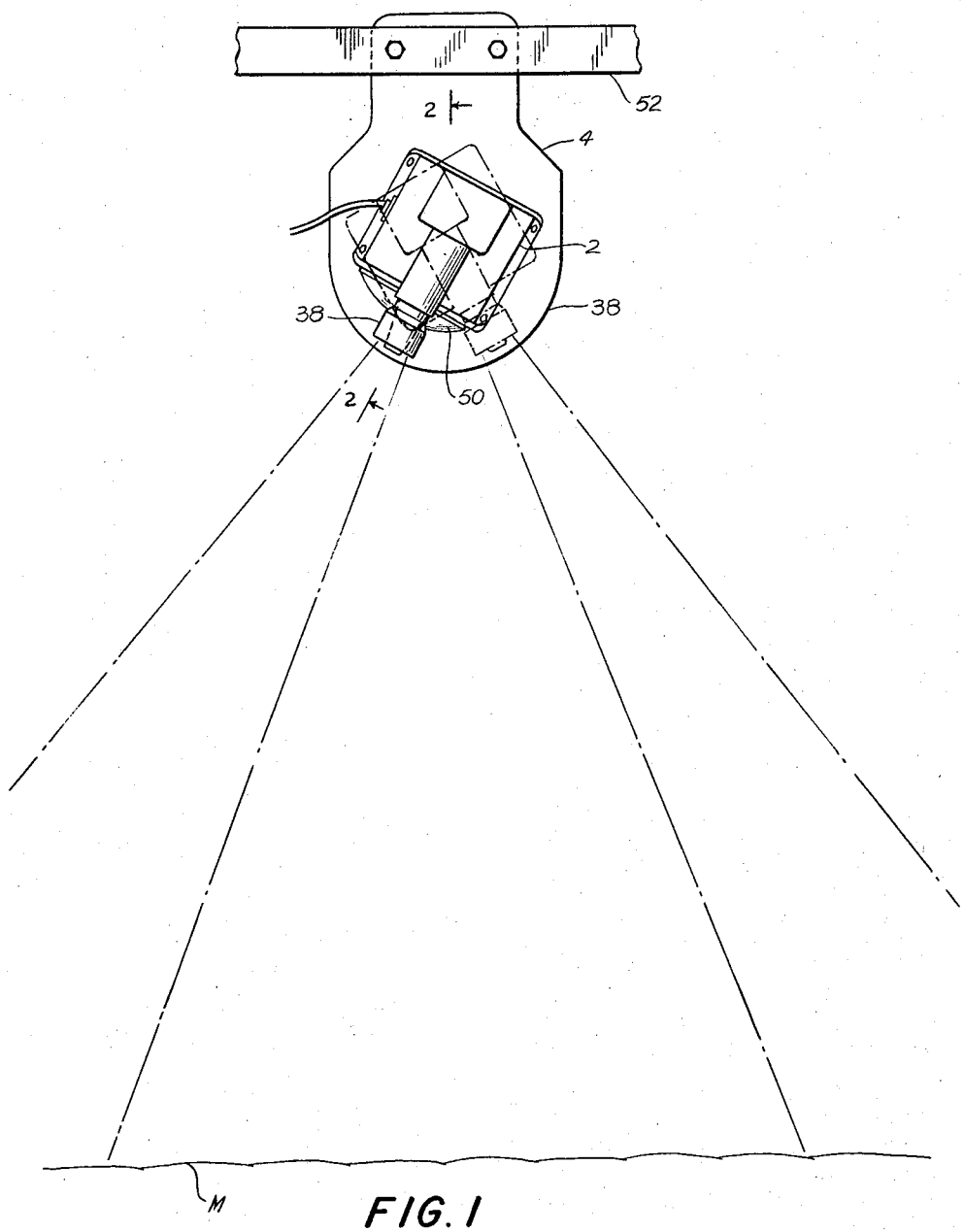
Fig. 1 is a schematic elevational view showing a scanning unit in accordance with the invention mounted above a sheet or width of material to be inspected.

As illustrated in the drawings, the apparatus in accordance with the invention comprises a scanning unit and associated electrical equipment. The scanning unit is mounted in selected position spaced from the material to be inspected and directed toward the material. The unit is oscillatable about its axis so as to scan the full width of the material. Most of the electrical components are suitably mounted on a panel or in a cabinet at any desired location and are electrically connected with the scanning unit.

As shown in Figs. 1 to 4, the scanning unit 1 comprises a housing 2 having a base plate 3 rotatably mounted on a mounting plate 4 by means of pivot shaft 5 and tapered roller bearings 6 fitted in a cylindrical boss 7 integral with the base plate 3. The housing 2 is thus mounted so as to be rotatable about the axis of the pivot shaft 5. Means is provided for cyclically rotating the housing 2 relative to the mounting plate. In some installations, for example in scanning circular fabric, the scanning unit is rotated continuously in the same direction. In the embodiment shown in the drawings, which is intended for inspecting flat fabric or other material, the scanning unit is oscillated about its axis through a selected arc.

The mechanism for oscillating the scanning unit is shown as comprising an electric motor 10 supported by a plate 11 which is mounted on the mounting plate 4 by means of a plurality of posts 12. The motor 10 has a shaft 13 and preferably includes self-contained speed reducing means so that the shaft 13 rotates at a selected speed which in the present embodiment is of the order of 30 r.p.m. A cam 14 fixed on the motor shaft 13 engages a cam follower shown in the form of a roller 15 carried by a throw arm 16 which is swingable about a pivot member 17 carried by a support 18 which is secured to the mounting plate 4 by means of screw studs 19. The studs 19 extend through elongated holes in the support 18 to permit lateral adjustment of the pivot axis of the throw arm 16 to position the scanning path laterally on the cloth. As will be seen from Fig. 3, the cam 14 is somewhat heart-shaped to provide constant linear scanning speed. Starting from the position shown in Fig. 3, engagement of the rotating cam 14 with the cam follower 15 swings the arm 16 counterclockwise during approximately the first half revolution of the cam. A spring 20 acting between the arm 16 and a post 21 on the mounting plate 4 maintains the roller 15 in engagement with the cam 14 and returns the arm during the next half revolution of the cam. The spring 20 is affixed to the post 21 by means of a sleeve 22 which can be turned on the stud 21 to vary the tension of the spring and is then secured in adjusted position for example by means of a set screw.

At its outer end, the throw arm 16 is provided with a longitudinally extending slot 24 to receive a roller 25 mounted on the underside of the base plate 3 of the housing 2. The roller 25 is carried by a stub shaft 26 fixed in the outer end of an internally threaded sleeve 27 which is screwed onto the threaded stem of a T-shaped fitting 28 that extends through a slot in the base plate 3. The fitting 28 has an internally threaded sleeve portion 29 which is disposed at right angles to the stem and receives a threaded shaft 30 which is mounted in a slot or recess in the base plate 3 so as to be rotatable but held against axial movement. Rotation of the shaft 30, for example by a screw driver slot in the end of the shaft, causes the fitting 28 to move axially of the shaft and thereby move the roller 25 lengthwise of the slot 24 in the throw arm 16. The fitting is locked in adjusted position by tightening the threaded sleeve 27 on the stem of the fitting 28 so as to cause the inner end of the sleeve to engage tightly against the underface of the base plate 3 and thereby clamp the entire assembly rigidly in position.

From the foregoing description, it will be seen that the housing 2 is operatively connected to the throw arm 16 by engagement of the roller 25 in the slot 24 of the arm and is hence oscillated about the pivot shaft 5 when the arm 16 actuated by the cam 14 is oscillated about its pivot 17. The angle through which the housing is oscillated depends on the shape and size of the cam 14 and on the position to which the roller 25 is adjusted. Moreover, lateral adjustment of the pivot 17 of the throw arm 16 permits adjustment of the end positions of the housing 2 in its oscillatory stroke. The axis of oscillation is preferably near the center of gravity of the oscillating unit to keep the moment of inertia at a minimum.

To assist in effecting quick reversal of motion of the housing without objectionable shock at the ends of its oscillatory stroke, recoil means is preferably provided for absorbing the kinetic energy of the housing and associated parts at the end of each stroke and reapplying the energy to accelerate the housing on the return stroke. This recoil means is shown in the drawings as comprising spring pressed plungers 31 (Fig. 3) working in cylinders 32 adjustably mounted on the mounting plate 4 in position for the plungers to be engaged by the throw arm 16 as it approaches the ends of its stroke. Compression springs (not shown) act between the plungers 31 and threaded sleeves 33 which are screwed into internally threaded end portions of the cylinders 32 to provide for adjustment of the force exerted by the springs on the plungers. The stroke of the plungers 31 is accurately adjustable by means of screws 34. Undesirable overthrow of the arm 16 and the housing 2 is thereby effectively avoided.

The housing 2 contains a light radiation receiving element together with means for directing on said element radiations received from the material being inspected. As shown in the drawings, the radiation receiving element is a phototube 35 mounted on a base 36 carried by a partition 37 of the housing 2. Light from the material being inspected is directed onto the photosensitive tube 35 by a lens assembly 38 that is axially adjustable in a lens sleeve 39 mounted in a lens housing 40. The lens assembly 38 is held in adjusted positions by means of one or more stud screws 41. To the rear of the lens assembly 38 in the lens tube 39 there are a front diaphragm 42 and an intermediate diaphragm 43. A spacer spring 44 holds the front diaphragm against the rear end of the lens assembly 38, regardless of its axial adjustment, and holds the intermediate diaphragm 43 against the front face of a lens retainer 45. Each of the diaphragms 42, 43 has a central opening, the opening of the front diaphragm being larger than that of the intermediate diaphragm. In a central aperture in the lens retainer 45, there is removably mounted a reticle 46 comprising a transparent disc having on one face an opaque coating or layer in which there is engraved a transparent slit. A concave spreader lens 47 is mounted in the aperture of the lens retainer 45 and is spaced rearwardly of the reticle 46.

The lens assembly 38 is in the nature of a telescopic objective lens which is axially adjustable to focus on the reticle 46 an image of the material being inspected. Light passing through the slit in the reticle is spread by the lens 47 and falls on the photosensitive tube 35. The optical characteristics of the lens assembly 38 are such that an image of a very small portion of the fabric or other material is projected on the reticle 46 at any one time. When the housing 2 and hence the optical system are oscillated as described above, the image on the reticle 46 is continually changing. The position of the scanning unit and the stroke of the oscillating assembly are such that the optical system scans the fabric from edge to edge. As long as the fabric is uniform and hence free from defects, the light falling on the photosensitive tube 35 remains substantially constant. However, if a defect occurs, there will be a variation in the amount of light falling on the tube 35 when the image of the defect passes across the slit of the reticle 46. As defects in knitted fabric ordinarily extend longitudinally of the fabric, the slit in the reticle 46 is positioned so as to be aligned with the image of a run or other longitudinally extending defect and is of a width corresponding to that of the image of, for example, one to three wales of the fabric. The apparatus is sufficiently sensitive to detect a run or other defect that is only one wale wide. As will be described more fully below, the phototube 35 is connected to the electrical system of the apparatus through an amplifier 48A constituting part of a dual tube 48 which is mounted in the housing 2 and makes it possible for a relatively weak signal from the phototube 35 to be transmitted to the electrical equipment even though the latter is located some distance away.

While the apparatus so far described is operable with room lighting or other suitable light source, it is preferable to provide a light source and a suitable condensing lens or reflector system that are associated with the oscillating unit and provide a beam of light that sweeps back and forth across the fabric as the unit oscillates. In the drawings there is shown a sealed beam spot-light 50 which is removably mounted in the housing 2 by means of screws 51 which preferably also provide for adjustment to align the light with the optical system. The light 50 is conveniently of the type used on automobiles and directs a beam of light to illuminate brightly the area of fabric or other material instantaneously being viewed by the optical system. It will be understood that if the receiving element 35 is sensitive to radiations other than those of the visible spectrum, the element 50 that has for convenience been referred to as a "light" will be a suitable transmitter of such radiations, consisting for example of a radiation source and a parabolic reflector or other suitable means for directing a beam of such radiation onto the material to be inspected.

The shape of the cam 14 is preferably such that the point at which the scanning unit is directed moves across the fabric or other material at a substantially uniform linear speed. It will be understood that to accomplish this, the angular speed must vary. If the surface being inspected is flat, the distance from the surface to the scanning unit will vary slightly as the scanning unit oscillates but this variation has not been found to interfere with the proper operation of the apparatus. To avoid excessive variation of distance, it is desirable to restrict the oscillation of the scanning unit to an angle less than 90° and preferably of the order of 75° when scanning a flat surface. In Fig. 1 the scanning unit 1 is shown mounted on a suitable support 52 at a distance from the material M that is to be scanned. During the scanning operation, the material itself is moving longitudinally and hence in a direction at approximately right angles to the direction of scanning. The scanning unit is located sufficiently far from the material to be out of the way and to scan the width of the material while keeping the angle of oscillation within the limits indicated above. On the other hand, it is desirable not to have the scanning unit too far from the material in order to avoid putting excessive demands on the optical system. In practice, it has been found that the distance from the scanning unit to the material should be somewhat greater than half the width of the material but preferably not greater than twice the width.

The electrical circuitry of the apparatus (Figs. 9A and 9B) comprises a phototube chassis 53 including the phototube 35, a power supply circuit 54 and an amplifying and gating circuit 55. The phototube chassis 53 is accommodated in the housing 2 and is detachably connected to the remaining circuitry by a multiple conductor plug 56A fitting into a matching receptacle 56B. The power supply operates from a suitable source, for example 110 volt A.C. mains 57, and supplies regulated voltages of selected constant value to the several components of the equipment as required. The power supply circuit is shown in Fig. 9A as comprising a transformer 58 having primary windings 59 connected through a switch 60 to the supply mains 57. The secondary 61 of the transformer is provided with a plurality of taps to furnish the various voltages required. Leads 63 and 64 provide 6.3 volt current to heaters for various tubes. A circuit comprising a transformer secondary lead 65, tubes 66 and 67 and a series of gas filled diodes 68 together with connections and associated components as shown in the drawings supplies a high negative voltage, for example, 590 volts, through lead 69 to terminal A' of receptacle 65B. A lead 70 connected between two of the diodes supplies B— voltage, for example —150 volts. A further circuit comprising transformer secondary leads 65, 71, 72 and 73, tubes 74, 75 and 77 and gas filled diodes 78 with the connections and associated components shown in the drawings supplies a B+ voltage of constant value, for example 250 volts, to a supply lead 80 and to terminal E' of the receptacle 56B.

The phototube 35 is a photomultiplier having a cathode 81, an anode 82 and a plurality of dynodes 83. The cathode 81 is connected by a suitable lead 84 to terminal A of the plug 56A through which a high negative voltage, for example minus 590 volts, is supplied to the cathode from lead 69 of the power supply circuit described above. The dynodes 83 are connected to the lead 84 through a series of resistances 85 in the manner shown so that the negative supply voltages applied to the dynodes are successfully of lower value. In the operation of the tube, electrons emitted by the cathode when light strikes it are directed to the first dynode where more electrons are produced by secondary emission. These electrons are directed to the second dynode and produce a still larger number of electrons which are directed in turn to the third dynode. This is continued through the entire series of dynodes. The dynodes thus have the effect of multiplying the emission of the cathode so as to obtain a current of higher value. The phototube 35 is provided with a shield 86 which is connected through a high resistance 87 to the lead 84. The shield is provided with a suitable window for transmission of light from the optical system to the phototube.

The anode 82 of the photomultiplier 35 is connected through a resistance 88, a lead 88a and the central terminal of the plug 56A to a meter M.A. The anode is also connected to the grid of the cathode follower 48A, the plate of which is connected through a resistance 91a and a lead 91 to terminal E of the plug 56A to which B+ voltage is supplied by lead 80. The plate of the tube 48A is also connected by a lead 92 to an output plug 93A. The cathode is grounded with the connections shown, a sudden change in the amount of light falling on the cathode of the phototube produces a pulse which is amplified by the tube 48A and the amplified pulse is transmitted to the output 93A.

The output plug 93A of the phototube chassis connects with a mating input receptacle 93B of the amplifying and gating circuit shown in Fig. 9B. The input 93B is connected through a condenser 94, filter circuit 95 and potentiometer 96 to the control grid of an amplifying tube 97 which inverts and amplifies a positive signal pulse from the phototube. The plate of the tube 97 is in turn connected through a condenser 98 and limiter diode 99 to the control grid of a second amplifying tube 100 by which the signal pulse is further amplified and inverted so that it is again positive.

With the circuit so far described each variation in the amount of light falling on the phototube produces a pulse which, if of selected frequency to be passed by the filter 95 and of sufficient magnitude to pass the limiter diode 99, is amplified by tubes 97 and 100. Pulses produced by minor variations not amounting to defects are blocked by the filter circuit and limiter diode. In order further to avoid spurious responses, it is a feature of the present invention to prevent a response unless the scanning unit "sees" a defect twice in the same location in successive scanning cycles. If there is an actual defect, for example a run in the fabric, a pulse will be produced when the defect is first seen by the scanning unit and a pulse will be transmitted to the amplifying circuit as described. However, this pulse is not transmitted to the output of the apparatus unless there is a second pulse in the same location of the next succeeding scanning cycle. The scanner thus takes "a second look" to make sure that a pulse from the phototube is actually caused by a defect and is not merely a spurious signal. A further feature of the apparatus is that if the signal is outside a normal range of magnitude, as for example when an extraneous object comes between the scanning unit and the material being scanned, the apparatus does not respond. These features are obtained by virtue of a multiple gating circuit which will now be described.

The gating circuit comprises a thyratron 101, the control grid of which is connected by a lead 102 to the plate of the second amplifier 100. The operating coil of a relay 103 is connected in the plate circuit of the thyratron so as to be energized when the thyratron fires. The relay 103 has three sets of contacts, A", B" and C" of which contacts A" and C" are normally closed while contacts B" are normally open. The operating coil of the relay is connected to the plate of the thyratron 101 through normally closed contacts A" which open when the relay is energized to cut off the thyratron. However, the relay is kept energized temporarily by a condenser 104 connected across the operating coil. The characteristics of the relay are such that it drops out after a selected time interval which in the present example is approximately 1.8 seconds after it is energized. The voltage across the thyratron and hence the decay time of the relay 103 is adjustable by a variable resistance 105. When the relay 103 drops out, contacts C" close to supply voltage through leads 106 from the B+ lead 80 to the control grid of a single-short multi-vibrator tube 107. The multi-vibrator 107 together with the associated circuitry has the characteristic of producing a single long negative pulse of, for example, 0.4 second duration which is applied through a lead 110 to the control grid of a first gating tube 111A. The characteristics of the multi-vibrator are adjustable by means of a variable resistance 112. The control grid of a second gating tube 111B is connected through lead 113, contacts B" of relay 103 and lead 114 with the B— lead 70 from the power supply. A negative pulse is thereby applied to the grid of the second gating tube 111B when the relay 103 closes.

Gating tubes 111A and 111B cooperate as will be explained below to prevent a response unless the scanning unit "sees" a defect in the same location in two successive scanning cycles. The gating circuit comprises a third gating tube which prevents responses to a signal exceeding a predetermined value, as for example when some object passes between the scanning unit and the material. The other half 48B of the dual tube 48 in the phototube chassis (Fig. 9A) has a control grid connected through condensers 116 and 116a and lead 117 to the anode 82 of the phototube 35. A feed-back circuit 118 suppresses noise by blocking all frequencies except a selected signal frequency, for example, 1000 cycles per second. The plate of tube 48B is connected through a lead 119, terminals B of the plug 56A, lead 119a and limiter diode 120 to the control grid of an amplifier tube 121A. The plate of tube 121A is connected through a suitable resistance to the control grid of the third gating tube 121B. The limiter diode 120 has the characteristic of passing a pulse that exceeds a predetermined magnitude. When the light transmitted to the phototube 35 is suddenly decreased, there is produced a negative pulse which, if passed by the limiter diode 120, is amplified and inverted to apply a positive pulse to the grid of the third gating tube 121B.

The plates of gating tubes 111A and 111B are connected by a lead 124 to an output lead 125 which is connected through a resistance 126 to the B+ supply line 80. The plate of the third gating tube 121B is likewise connected to the output lead 125 by a lead 127. The cathodes of the gating tubes are connected to ground. It will thus be seen that if any of the gating tubes is conducting, the output lead 125 is grounded. In order to produce an output voltage in lead 125, all of the gating tubes must be non-conducting. Gating tubes 111A and 111B are normally conducting and are rendered non-conducting only when negative pulses are applied to both grids at the same time. The third gating tube 121B is normally non-conducting but is rendered conducting by the application of a positive pulse of predetermined magnitude produced for example by an object passing between the scanner and the material being inspected. At approximately 1.8 seconds after the first signal pulse the relay 103 drops out and by the closing of contacts C" energizes multi-vibrator 107 to apply a single negative pulse of approximately 0.4 second duration to the grid of gating tube 111A to render it non-conducting. On the next forward swing of the scanner, the scanning unit again sees the defect D causing the phototube to send out a third signal pulse. As the contacts A" of relay 103 are now closed, the thyratron 101 will again fire and thereby energize the relay. The closing of relay contacts B" applies a negative pulse to the grid of gating tube 111B so that this tube likewise becomes non-conducting. It will be seen that tubes 111A and 111B become non-conducting at the same time only if the third pulse from the phototube occurs not earlier than 1.8 seconds and not later than 2.2 seconds after the first pulse and hence only if the scanning unit sees a defect in substantially the same location on its second forward swing. Assuming that the gating tube 121B is also non-conducting, as it normally is, the voltage of the output lead 125 rises to open circuit B+ voltage when gating tubes 111A and 111B are rendered non-conducting at the same time as described.

If the pulse emitted by the phototube 35 exceeds a predetermined value as for example when some object passes between the scanner and the material being inspected, the pulse renders gating tube 121B conducting so that the output lead 125 is kept grounded even though gating tubes 111A and 111B are both non-conducting. Hence, if some extraneous object comes between the scanner and the material, the apparatus will not respond even though the circumstances are such that gating tubes 111A and 111B are rendered non-conducting at the same time.

The output lead 125 is connected to the grid of a thyratron 130. When the voltage in lead 125 rises as described above, the thyratron fires and energizes a relay 131 connected in the plate circuit of the thyratron. A condenser 134 is connected across the operating coil of the relay. The relay 131 has operating contacts X, Y and Z. Contacts X are connected to a three pole receptacle 132 to supply a signal to any desired external circuit, for example an indicator or alarm circuit or a stop-motion device. For example, if the scanning apparatus of the invention is being used with a knitting machine, the receptacle 132 provides a connection to a stop-motion device which operates to stop the machine when relay 131 is energized. A manual switch 132 is operable to turn the automatic stop-motion on or off. The switch will normally be in "on" position when automatic control of the machine is desired.

A further feature of the invention is the provision of a fourth gating circuit to prevent excitation of the thyratron 130 controlling relay 131 when the machine controlled by the apparatus is stopped. The fourth gating circuit is shown as comprising a dual tube 135 (Fig. 9B) of which section 135A is an amplifier and section 135B is a gating tube. The grid circuit of tube 135A comprises a time delay circuit including a condenser 136 and an adjustable voltage divider 137 connected at one end to ground and at the other end through contacts Y of relay 131 to a B— supply. The plate of tube 135A is connected with the grid circuit of tube 135B in such manner that when tube 135A is conducting, tube 135B is at cut-off.

A relay 138 has normally closed contacts which are connected in the grid circuit of tube 135A in parallel with the normally opened contacts Y of relay 131. Relay 138 is connected by a receptacle 139 with an external circuit which is controlled by operation of the machine with which the apparatus is being used and which energizes relay 138 when the machine is running.

When the machine is running, thyratron 130 is non-conducting, relay 131 is deenergized, the amplifier tube 135A is conducting so that gating tube 135B is at cut-off and relay 138 is energized so that its contacts are open.

As described above, gating tubes 111A and 111B are normally conducting so as to ground conductor 125 and gating tube 121B is normally non-conducting. If a defect is observed by the scanner, gating tubes 111A and 111B are cut off as described above and the voltage in conductor 125 rises so that the thyratron 130 fires. This energizes relay 131 and charges condenser 134. Contacts X of relay 131 are operated to stop the machine controlled by the apparatus. Contacts Y of relay 131 close so that a negative bias is applied to the grid of amplifier tube 135A causing the amplifier to become non-conducting and the gating tube 135B to become conducting so as to ground conductor 125 and thereby prevent re-excitation of the thyratron 130. When relay 131 is energized, its contacts Z are opened so as to cut off the current from thyratron 130. However, the relay is kept energized for a predetermined period of time, for example two seconds, by the condenser 134. In the meantime, the machine has stopped and relay 138 has been deenergized so that its contacts are closed before the parallel contacts Y of relay 131 open. Hence gating tube 135B remains conducting. Even though the scanner continues to see the defect which was originally observed, the thyratron 130 will not be fired and relay 131 will not be reenergized since conductor 125 is kept grounded by the conduction of gating tube 135B.

Before restarting the machine, an operator will presumably remedy the cause of the defect, for example by splicing a broken yarn or replacing a defective needle. However, when the machine is restarted, the defect is still in the field of the scanning apparatus and it is therefore desirable to keep the scanner from immediately tripping the stop-motion mechanism again. This is accomplished by the fourth gating tube 135B. When the machine starts, the contacts of relay 138 open. However, the amplifier tube 135A is kept at cut-off by the time delay circuit comprising the condenser 136 and resistance 137. After a predetermined period of time, amplifier tube 135A becomes conducting and cuts off gating tube 135B so that the scanning apparatus will again be responsive to defect signals. The amount of delay is adjustable by varying resistance 137.

Electric current of suitable voltage, for example, 6.3 volts, for the lamp 50 is supplied from 110 volt mains by a transformer 140 from 110 volt mains, as illustrated in Fig. 9B.

Figure 5:
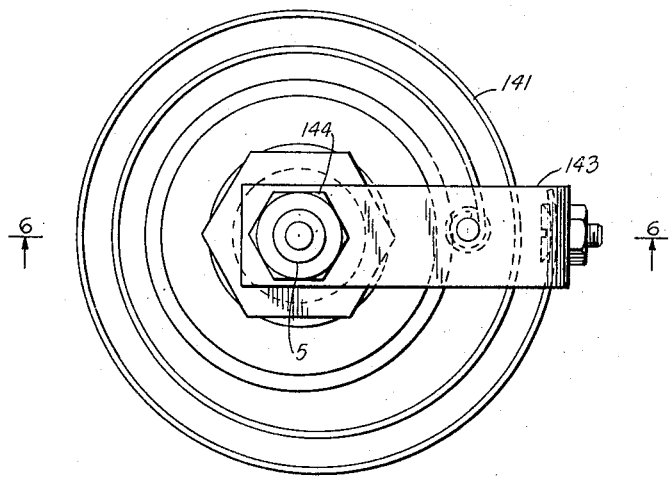
Fig. 5 is a fragmentary enlarged view looking approximately from the line 5—5 in Fig. 2 but showing a modification.
Figure 6:
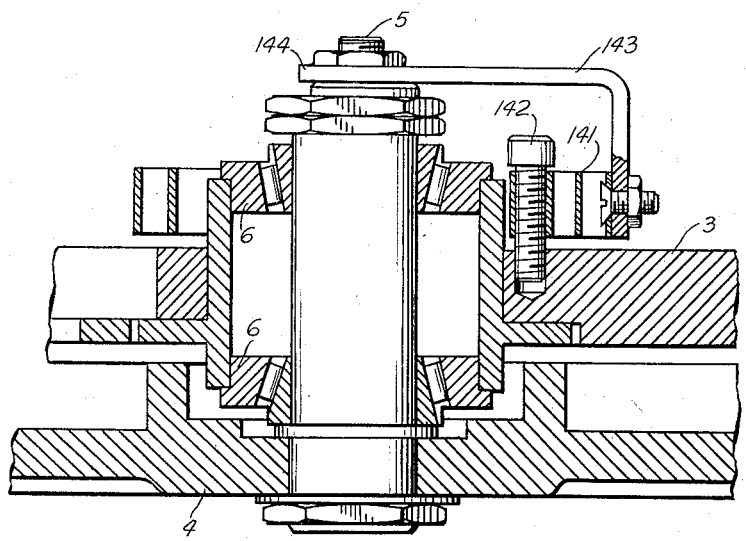
Fig. 6 is a fragmentary section taken approximately on the line 6—6 in Fig. 5.

Several modifications of the construction shown in Figs. 1 to 4 are illustrated in Figs. 5 to 8. In the modification of Figs. 5 and 6, the spring 20 shown in Fig. 3 which acts on the arm 16 to keep the cam follower 15 against the cam 14 and thereby effect return movement of the housing is replaced by a spiral spring 141 which acts between a stud 142 fixed to base plate 3 of the housing and an arm 143 adjustably fixed to the stationary pivot shaft 5 by means of a nut 144. The tension of spring 141 is readily adjustable by loosening nut 144, swinging the arm 143 to a position to provide the desired tension and then tightening nut 144 to clamp the arm in adjusted position. It will be seen that the spiral spring 141 acts between the housing and the pivot shaft 5 which is fixed to the stationary mounting plate 4. By thus acting on the housing rather than on the throw arm 16, the spring 141 takes out any slack or play that may exist in the connections between the arm 16 and the oscillating housing.

Figure 7:
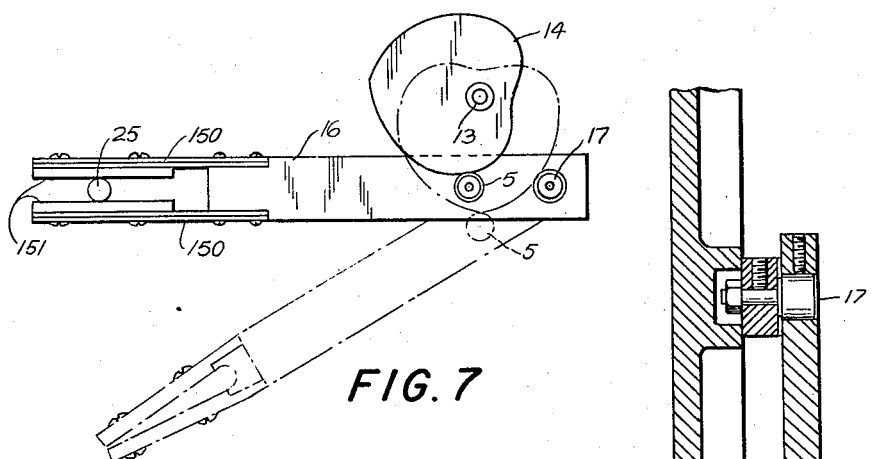
Fig. 7 is a schematic view corresponding to a portion of Fig. 3 but showing a modification.
Figure 2:
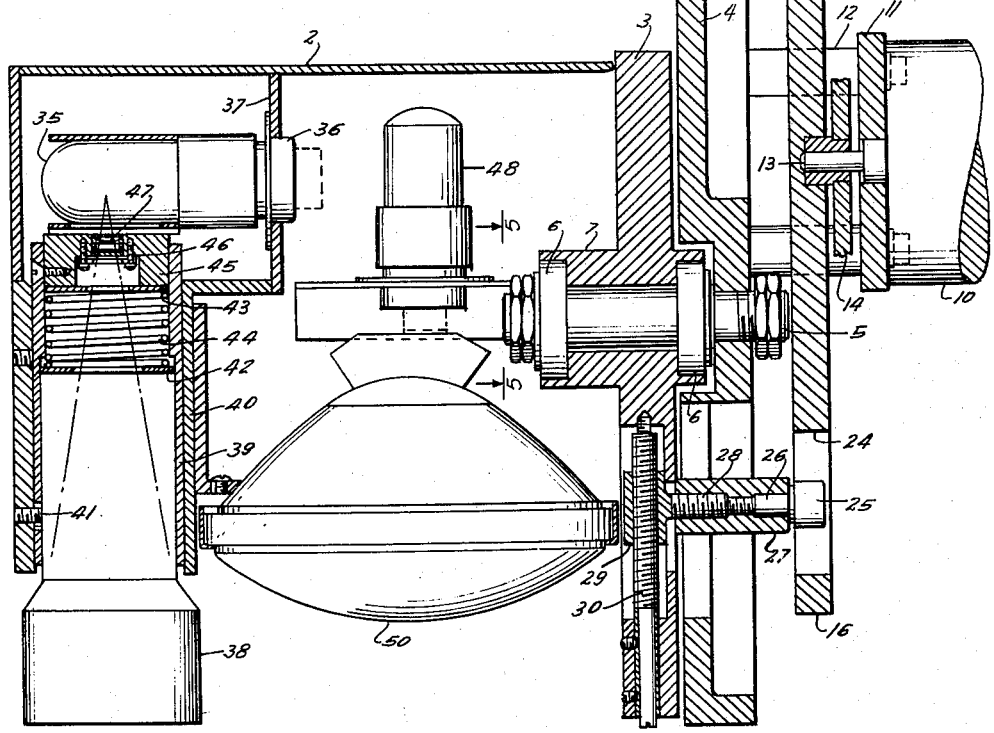
Fig. 2 is a vertical section on a larger scale taken approximately on the line 2—2 in Fig. 1.

A modification of the throw arm 16 is illustrated in Fig. 7. The modified throw arm 16' has an end portion which is stepped to received opposed leaf springs 150 which carry hardened blocks 151 on their inner faces. The roller 25 by means of which the housing 2 is oscillated is received between the blocks 151. The leaf springs 150 are shaped so that when they are relieved from tension, they converge toward one another as illustrated in broken lines, with the roller 25 removed. When the roller is inserted between the hardened blocks 151, the leaf springs are flexed apart and are thus pretensioned. The construction shown in Fig. 7 avoids slack in the connection between the throw arm 16' and the oscillating housing 2 and provides a cushioning connection to avoid shocks.

Figure 8:
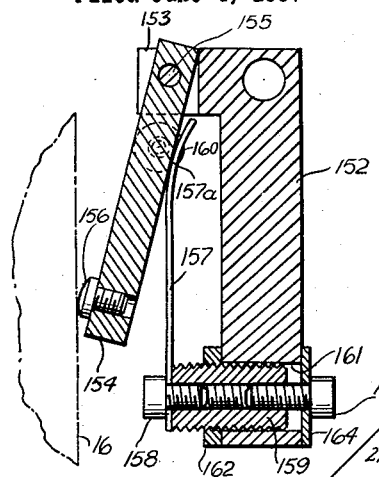
Fig. 8 is a fragmentary sectional view taken in a plane parallel to Fig. 3 and showing another form of recoil means.
Figure 3:
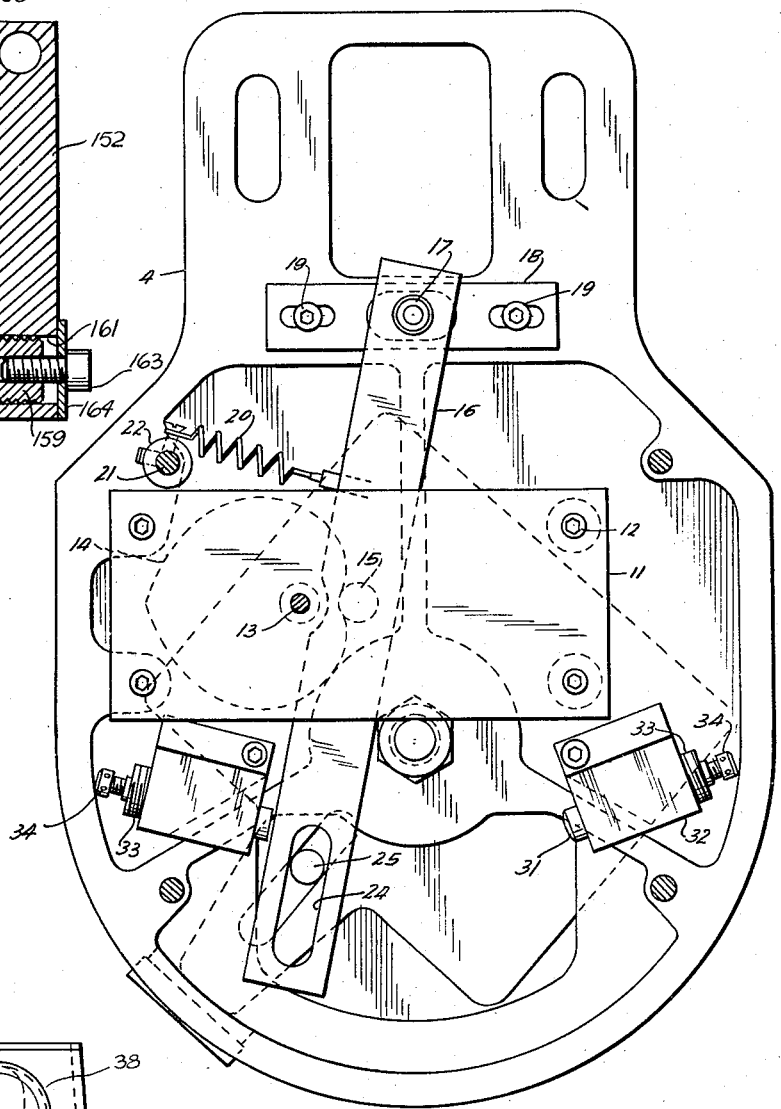
Fig. 3 is a rear elevational view showing a mounting plate for the unit and mechanism for oscillating the unit about its axis.
Figure 4:
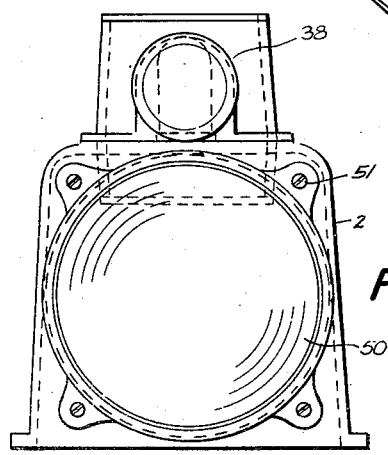
Fig. 4 is a partial front view of the scanning unit.

Figure 8 shows a preferred recoil means to replace the recoil means comprising plunger 31 and cylinder 32 shown in Fig. 3. The recoil means illustrated in Fig. 8 comprises a block 152 which is secured to the mounting plate 4 so as to be approximately parallel to the throw arm 16 when the arm is at the end of its stroke. The block 152 is L-shaped with a bifurcated portion 153 on which an arm 154 is pivotally mounted by a pivot pin 155. Near its free end, the arm 154 carries a nylon or other contact button 156. It will be seen that the pivotal mounting of arm 154 permits it to swing out only a limited distance to approximately the position shown in Fig. 8. One end of a leaf spring 157 is secured by a screw 158 to an internally and externally threaded bushing 159. The free end 157A of the spring is curved and engages the arm 154 near its pivot 155 when the arm is in the outer position shown. Lateral displacement of the spring is prevented by washers 160 secured to opposite sides of arm 154. In order to vary the position and tension of the spring 157, the bushing 159 is adjustably mounted in a hole 161 through block 152 by means of a nut 162 screwed onto the bushing and a threaded stud 163 which screws into the threaded bore of the bushing and has a head portion bearing on a washer 164. The bushing 159 is thus adjustable axially in hole 161 by loosening the nut 162 and tightening the stud 163 or vice versa.

As the throw arm 16 approaches the end of its stroke in either direction, it engages the contact button 156 of the respective recoil device. Initial resistance of the arm 154 to movement by the throw arm is relatively low since the spring 157 engages the arm 154 near its pivot. As the arm 154 is swung toward block 152 the point of contact between the spring 157 moves closer to the anchoring bushing 159 of the spring and farther from the pivot 155 of the arm 154. The resistance offered by the spring thus rapidly increases. As the throw arm 16 reaches the end of its stroke, the arm 154 of the recoil device engages spring 157 close to the bushing 159 so as to provide a positive stop while avoiding abrupt shock. The recoil device makes it possible to reverse the direction of movement of the oscillating housing at the end of its swing almost instantaneously so that the linear movement of the scanning point on the work is substantially constant throughout virtually the entire extent of the path of movement.

From the foregoing description, it will be seen that the invention provides inspecting apparatus which is extremely sensitive and yet substantially eliminates the possibility of spurious responses. The apparatus has the further advantage that it does not encumber a loom, knitting machine or other equipment to which it is applied and conversely there is little likelihood of the scanning apparatus being damaged by workmen servicing the loom or other machine.

While preferred embodiments of the invention have been shown in the drawings and particularly described, it will be understood that the invention is not in any way limited to these embodiments.

What we claim and desire to secure by Letters Patent is:

1. Apparatus for scanning a width of longitudinally moving material to detect defects therein, comprising an oscillating scanning unit, means mounting said unit at a selected distance from said material for oscillation about an axis approximately parallel to the direction of movement of said material, means for cyclically oscillating said unit through an angle embracing the width of material to be scanned, said unit comprising a light sensitive electrical pick-up element, means defining a narrow opening and an optical system for imaging successive portions of a selected band of said material through said opening onto said element as said unit is oscillated, said element comprising means for giving an electrical signal upon predetermined variation in the intensity of light falling on said element, and an electrical circuit including said pick-up element, means for amplifying said signal, first gating means actuated by signals from said pick-up element and a second gating means actuated by said signals with a delay equal approximately to the period of said cyclic oscillation of said scanning unit, said first and second gating means being interconnected to pass a signal only when both are actuated at the same time, whereby a signal is passed only when said scanning unit views a defect twice in the same position on successive oscillations of said unit.

2. Scanning apparatus according to claim 1, in which said oscillating unit further includes a lamp oscillating with said unit and directed toward said material to illuminate the portion of said material being viewed by said optical system.

3. Scanning apparatus according to claim 1, in which said means for oscillating said unit includes driving means for oscillating said unit at a variable angular speed such that the point of intersection of the axis of said optical system with said material moves at a substantially constant linear speed.

4. Scanning apparatus according to claim 1, in which said pick-up element comprises a photomultiplier.

5. Scanning apparatus according to claim 1, in which said electrical circuit further comprises a third gating means for blocking said signal when the light received by said pick-up element varies by an amount exceeding a predetermined value.

6. Apparatus for scanning a width of longitudinally moving material to detect defects therein, comprising a movable scanning unit, means movably mounting said unit and means for cyclically moving said unit to scan repeatedly across said material, said unit comprising a light sensitive electrical pick-up element, and an optical system viewing said material and imaging successive portions of a selected narrow band of said material onto said element as said unit scans said material, said element comprising means for giving an electrical signal upon predetermined variation in the intensity of light falling on said element, and an electrical circuit comprising said pick-up element, first gating means actuated by a signal from said pick-up element, a second gating means actuated by said signal with a delay equal approximately to the period of cyclical movement of said scanning unit and means interconnecting said first and second gating means to pass a signal only when both gating means are actuated at the same time so that a signal is passed only when said scanning unit views a defect in said material twice in the same position in successive scanning cycles.

7. Scanning apparatus according to claim 6, in which said electrical circuit further comprises a third gating means for blocking said signal when the light received by said pickup element varies by an amount exceeding a predetermined value.

8. Apparatus for scanning a width of material moving in a lengthwise direction to detect an irregularity in said material, comprising a scanning unit, means for mounting said unit at a selected distance from the material for angular movement about an axis approximately parallel to the length of said material, means for moving said unit to scan repeatedly across said material, said unit comprising a housing, a radiation-sensitive element in said housing, focusing means for directing onto said element radiation from a small increment of said material being momentarily scanned by said unit, said element comprising means for giving an electrical signal upon predetermined variation in intensity of radiation falling on said element, and an electrical circuit comprising said pick-up element, first gating means actuated by a signal from said pick-up element, second gating means actuated by said signal with a delay equal approximately to the period of cyclical movement of said scanning unit and means connecting said first and second gating means to pass a signal only when both gating means are concurrently actuated so that a signal is passed only when said scanning unit views an irregularity in said material twice in the same position in successive scanning cycles.

References Cited in the file of this patent
UNITED STATES PATENTS

| 2,184,157 | Jones | Dec. 19, 1939 |
| 2,208,447 | Berry | July 16, 1940 |
| 2,493,543 | Merchant | Jan. 3, 1950 |
| 2,570,288 | Todd | Oct. 9, 1951 |
| 2,654,288 | Savadelis | Oct. 6, 1953 |
| 2,791,695 | Bareford et al. | May 7, 1957 |